Figure 1:
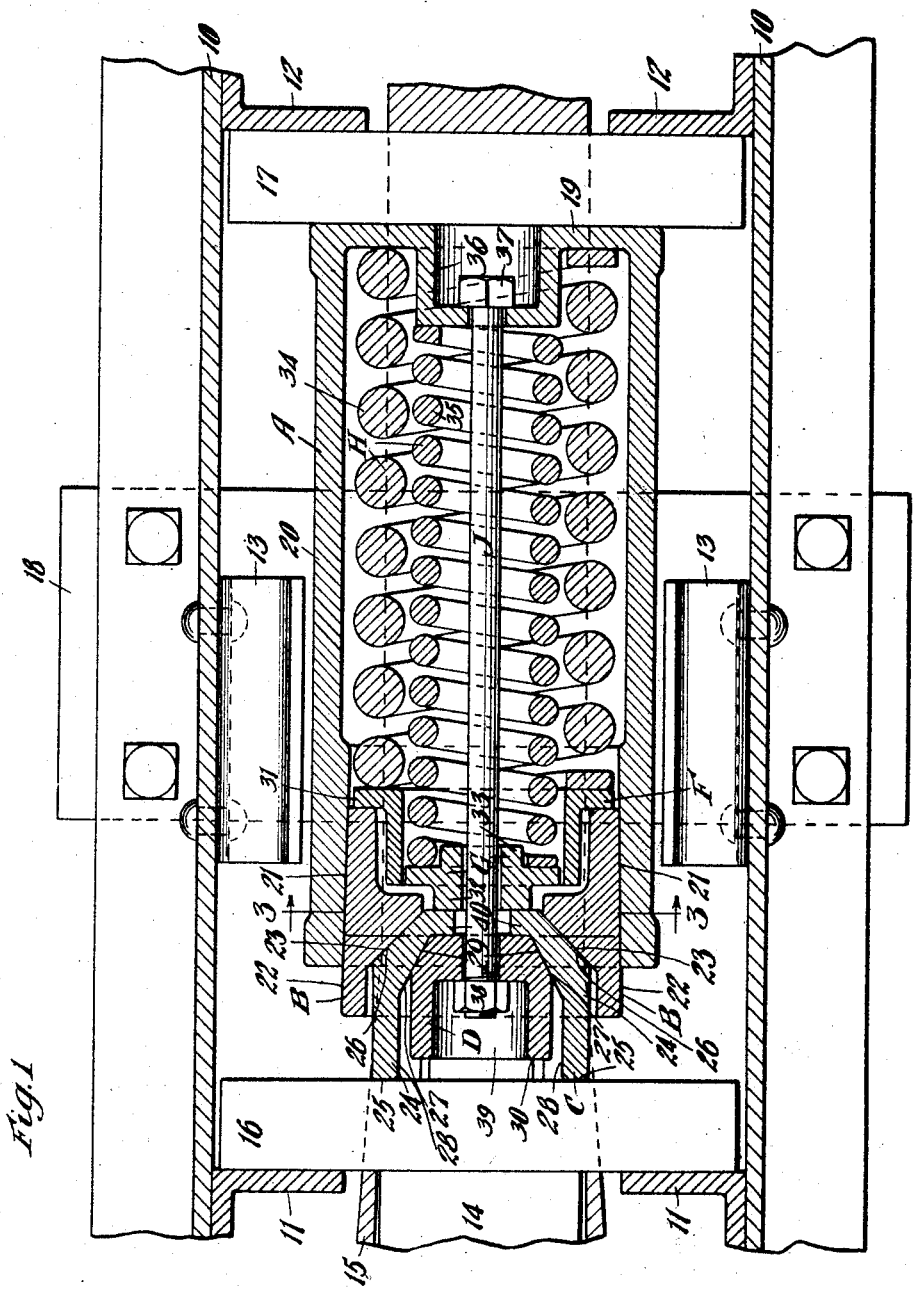

May 25, 1926.  
J. F. O'CONNOR  
1,586,323  
FRICTION SHOCK ABSORBING MECHANISM  
Filed August 23, 1923  2 Sheets-Sheet 1

Witnesses  
Wm. Geiger

Inventor  
John F. O'Connor  
By George J. Haight  
His Atty.

May 25, 1926.
J. F. O'CONNOR
1,586,323
FRICTION SHOCK ABSORBING MECHANISM
Filed August 23, 1923      2 Sheets-Sheet 2
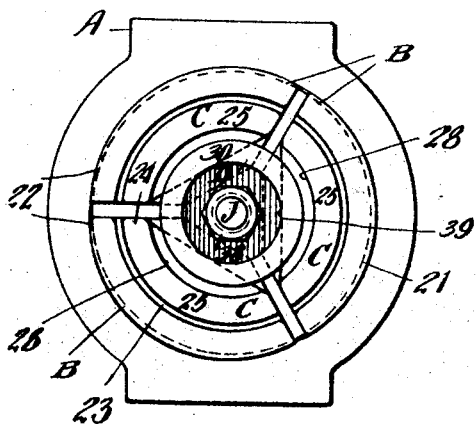
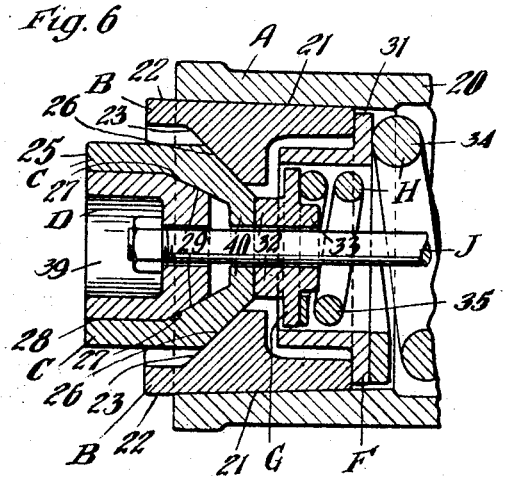
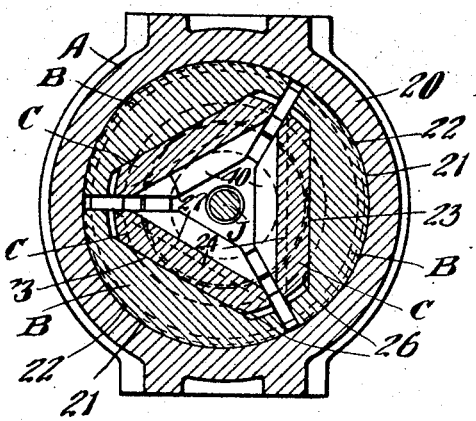
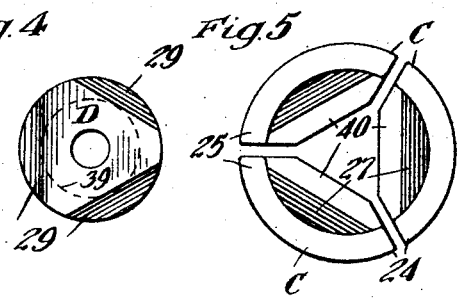
Witnesses
Wm. Geiger
Inventor
John F. O'Connor
By George I. Haight
His Atty.

Patented May 25, 1926.

1,586,323

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 23, 1923. Serial No. 658,873.

This invention relates to improvements in friction shock absorbing mechanisms.

One object of the invention is to provide a high capacity friction shock absorbing mechanism, especially designed for railway draft riggings, and wherein is also assured easy and certain release.

Another object of the invention is to provide a mechanism of the character indicated, comprising a wedge system including a plurality of wedge members, wherein, during initial action of the mechanism, the members comprising the wedge system have relative movement, thereby providing a preliminary action absorbing the lighter shocks, after which further relative movement of the wedge members is prevented whereby the wedge system acts in the manner of a single wedge unit during the remainder of the compression stroke.

Other objects and advantages of the invention will more clearly appear from the description and claims hereinafter following.

In the drawings forming a part of this specification, Figure 1 is a longitudinal, sectional view of a portion of a railway draft rigging, showing my improvements in connection therewith, the section corresponding to two section planes 120° apart. Figure 2 is a front end elevational view of the friction shell and wedges. Figure 3 is a transverse vertical sectional view, corresponding substantially to the line 3—3 of Figure 1. Figure 4 is a detailed rear end elevational view of an auxiliary wedge member used in connection with my improved mechanism. Figure 5 is a detailed front end elevational view of the sectional main wedge. And Figure 6 is a view similar to Figure 1 of the front end portion only of the shock absorbing mechanism, illustrating the position of the parts at the end of the preliminary action.

In said drawings, 10—10 denote channel draft sills of a railway car, provided on the inner faces thereof with front stop lugs 11, rear stop lugs 12 and friction shell guiding members 13. A portion of the draw bar is indicated at 14 and has connected thereto the hooded yoke 15. The shock absorbing mechanism proper together with the front follower 16 and the rear follower 17 are contained within the yoke. The yoke and the associated movable parts of the shock absorbing mechanism are held in operative position by a detachable saddle plate 18.

The improved shock absorbing mechanism proper, as shown, comprises, broadly, a combined friction shell and spring cage casting A; an annular series of three friction shoes B—B—B; a sectional outer main wedge C; an auxiliary wedge D; a main spring follower F; an auxiliary spring follower G; a spring resistance H; and a retainer bolt J.

The combined friction shell and spring cage A is of cylindrical form closed at the rear end by the end wall 19 abutting the rear follower 17. The shell A is provided with a substantially cylindrical wall 20. The inner wall of the shell, at the outer end of the cylindrical portion 20, is provided with three, slightly inwardly converging, independent, cylindrical friction surfaces 21. Upon reference to Figure 1, it will be evident that the friction shell A is held in central position between the draft sills 10 by the guide members 13. The combined friction shoes and wedges B are three in number as clearly shown in Figures 2 and 3 and are arranged in an annular series. Each of the friction shoes B is provided with an exterior cylindrical face 22 adapted to slide on one of the cylindrical friction surfaces 21 of the shell A, and a wedge face 23 on the inner side thereof adapted to coact with the sectional outer wedge C. The wedge faces 23 converge inwardly and are arranged at a relatively blunt angle with reference to the longitudinal axis of the shock absorbing mechanism. As clearly shown in Figure 3, the shoes B are spaced apart circumferentially of the shell a proper distance to permit of their relative approach during the inward movement along the inwardly converging friction surfaces 21 of the shell A.

The sectional outer wedge C is divided along radial lines and comprises three wedge sections 24. The wedge sections 24 are all of similar construction, each having a flat front end face 25 adapted to abut the front follower 16, an outer flat wedge face 26 at the rear end thereof, adapted to coact with the wedge face 23 of one of the friction shoes B, and an interior wedge face 27 adapted to coact with the inner auxiliary wedge D. The flat wedge faces 26, which coact with the flat wedge faces 23 of the shoes B, extend at a relatively blunt wedging angle with reference to the longitudinal axis of the mechanism, and the flat wedge faces 27, which coact with the auxiliary wedge D, extend at a relatively keen wedging angle with reference to the longitudinal axis of the mechanism. As clearly shown in Figures 1, 3 and 5, each of the wedge sections 24 is provided, forwardly of the wedge faces 27, with a longitudinally extending, inner, concave abutment face 28, for a purpose hereinafter described. At their inner ends, the wedge sections 24 are provided with inwardly extending flanges 40 adapted to coact with the inner end of the auxiliary wedge block D to limit the forward movement of the sections and retain them in properly assembled relation.

The auxiliary wedge D is in the form of a cylindrical hollow block, having three, symmetrically disposed, inwardly converging wedge faces 29 at the rear end thereof extending at a relatively keen angle to the axis of the mechanism and each adapted to coact with the corresponding face 27 of one of the wedge sections 24. At the front end, the auxiliary wedge D is provided with a flat abutment face 30 adapted to coact with the front follower, after a predetermined relative movement of the follower with reference to the shell, the face 30 being normally spaced inwardly from the follower 16.

The main spring follower F is in the form of a cylindrical sleeve having an annular outwardly projecting flange 31 at the rear end thereof adapted to abut the inner ends of the friction shoes B.

The auxiliary spring follower G is in the form of a disc provided with front and rear bosses 32 and 33, the flat front face of the boss 32 being adapted to engage with the inner flat ends of the sections 24 of the wedge C, forming an abutment therefor.

The spring resistance H comprises an outer, relatively heavy coiled spring 34 and an inner, relatively lighter coiled spring 35, the spring 34 being interposed between the rear wall 19 of the friction shell and the flange 31 of the follower F, and the spring 35 being interposed between an inwardly projecting hollow boss 36 on the end wall 19 of the friction shell and the auxiliary spring follower G with the boss 33 thereof projecting into the spring and centering the same.

The parts of the mechanism are held in assembled relation and under initial compression by the retainer bolt J extending through the inner spring 35 and alined recesses in the boss 36 of the spring follower G and the auxiliary wedge D, having one end thereof anchored to the rear end of the friction shell by means of the head 37 and the other end anchored to the auxiliary wedge D by means of the nut 38 abutting the rear wall of the recess 39 of the wedge D.

The operation of my improved shock absorbing mechanism is as follows, assuming a compression stroke of the mechanism under buff. As the sectional wedge C is moved toward the right, as viewed in Figure 1, that is, inwardly of the shell, the sections of said wedge will slide on the blunt angle faces 23 of the friction shoes B and also with respect to the keen angle faces 29 of the auxiliary wedge D. This action is obtained by reason of the static friction between the shoes B and the shell, the taper of the shell friction surfaces which resists movement of the shoes with respect to the shell, and the resistance afforded by the outer coil 34 of the spring resistance. It will be noted that, during this preliminary action of the mechanism, resistance to the described movement of the sectional wedge C is afforded only by the inner lighter coil 35 of the spring resistance, plus such resistance as is obtained frictionally on the sets of sliding friction surfaces to which reference has been made. This action of the sectional wedge continues until it is contracted and the faces 28 of the section 24 abut the cylindrical outer surface of the wedge block D, at which time the follower 16 will engage with the outer end of the wedge block D, the parts then being in the position shown in Figure 6. During this preliminary action, the shoes B will move slightly inwardly of the shell, which condition is also illustrated in Figure 6. After the preliminary action just described has taken place, it is evident that the auxiliary wedge D and the sectional wedge C will thereafter function as a single solid wedge unit and the wedging action during the remainder of the compression stroke will take place between the wedge faces 26 of the sectional wedge and the faces 23 of the shoes B. It will be evident that during the compression stroke of the mechanism, as the wedge shoes B are moved inwardly of the shell along the converging friction surfaces 21 thereof, a radial inward movement, toward the axis of the gear, of the friction shoes will be effected, thereby further compressing the outer spring and effecting a differential wedge action, the wedge faces 23 of the shoes slipping on the faces 26 of the sectional wedge C. It will also be evident that yielding resistance to the inward movement of the shoes B is always offered by the spring 34 due to the independent spring followers F and G, the spring follower G which co-acts with the wedge C being movable inwardly relatively to the follower F during the inward movement of the wedge C with reference to the shoes B.

Upon removal of the actuating pressure, the inner spring 35 will act first, to move the sectional wedge C and auxiliary wedge D outwardly, thereby reducing the wedge pressure, this releasing action being readily and instantaneously effected, due to the bluntness of the coacting faces 23 and 26 and the fact that the auxiliary wedge is free to move outwardly on the bolt J until arrested by engagement with the nut of the latter. Upon reduction of the wedging pressure as just described, all the parts are loosened and thereafter restored to normal position by the expanding action of the springs 34 and 35, outward movement of the sections 24 of the wedge C being limited by the flanges 40 thereof engaging the inner end of the auxiliary wedge D and outward movement of the auxiliary wedge being in turn limited by the nut of the bolt J.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell; a spring resistance; a friction generating system cooperating with said shell, said system including a plurality of friction shoes, a plurality of wedge elements adapted to initially receive the actuating force and an auxiliary wedge having effective wedging action on said wedge elements during initial action of the mechanism, said auxiliary wedge directly receiving the actuating force after a predetermined compression of the mechanism, said wedge elements and shoes having sets of engaging faces disposed at one angle with reference to the longitudinal axis of the mechanism and said auxiliary wedge and wedge elements having sets of engaging faces disposed at a different angle with reference to said axis; and means for preventing outward movement of said auxiliary wedge during the duration of said predetermined compression.

2. In a friction shock absorbing mechanism, the combination with a main follower; of a friction shell having inwardly converging friction surfaces on the interior thereof; a spring resistance; and a friction generating wedge system cooperable with the friction surfaces of the shell, said system including a plurality of friction shoes, a plurality of wedge elements adapted to initially receive the actuating force and an auxiliary wedge having an effective wedging action on said elements during a predetermined portion of the compression stroke, said wedge elements and shoes having sets of engaging faces disposed at one angle with reference to the direction of the applied force and said auxiliary wedge and wedge elements having sets of engaging faces disposed at a different angle with reference to the line of applied force, said auxiliary wedge being normally spaced from said main follower and held against outward movement relatively to the shell, said auxiliary wedge being engaged and moved by the follower subsequent to said predetermined portion of the stroke.

3. In a friction shock absorbing mechanism, the combination with a main follower; of a friction shell having inwardly converging friction surfaces on the interior thereof; a plurality of friction wedge shoes slidable on said shell friction surfaces, each shoe having a wedge face extending at a relatively blunt wedging angle with reference to the longitudinal axis of the mechanism; a spring resistance; an outer contractible wedge provided with a set of wedge faces extending at relatively blunt wedging angles with reference to the longitudinal axis of the mechanism and a second set of wedge faces extending at relatively keen angles with respect to said longitudinal axis, said first named set of wedge faces being adapted to coact with the wedge face of said shoes; and an inner wedge provided with a set of wedge faces extending at relatively keen angles with reference to said axis and adapted to coact with the keen angle wedge faces of said outer wedge, said inner wedge being interposed between the said outer wedge and the main follower.

4. In a friction shock absorbing mechanism, the combination with a cylindrical friction shell having inwardly converging cylindrical friction surfaces on the interior thereof; of a plurality of friction wedge shoes sliding on said shell friction surfaces, each shoe having a wedge face on the inner side thereof; a spring resistance; a wedge pressure transmitting means, including a plurality of wedge elements adapted to approach each other, each of said elements being provided with a pair of wedge faces, one face of each pair coacting with the wedge face of one of said shoes; and an inner central wedge provided with a plurality of wedge faces adapted to coact with the remaining wedge face of each pair of wedge faces on said elements, said inner wedge being disposed between said wedge elements and adapted to limit the relative approaching movement of the latter.

In witness that I claim the foregoing I have hereunto subscribed my name this 21st day of August 1923.

JOHN F. O'CONNOR.